United States Patent [19]

Zimmerly

[11] Patent Number: 5,439,024
[45] Date of Patent: Aug. 8, 1995

[54] SANITARY GATE VALVE WITH TAPERED VALVE PLUG

[75] Inventor: Robert D. Zimmerly, Kenosha, Wis.

[73] Assignee: Tri-Clover, Inc., Kenosha, Wis.

[21] Appl. No.: 987,670

[22] Filed: Dec. 9, 1992

[51] Int. Cl.⁶ .......................... F16K 3/00; B08B 9/06; B08B 3/00

[52] U.S. Cl. .................. 137/241; 134/166 C; 251/327; 251/328

[58] Field of Search ............... 137/241, 240; 251/327, 251/328, 329; 134/166 R, 166 C

[56] References Cited

U.S. PATENT DOCUMENTS

| | | | |
|---|---|---|---|
| Re. 25,177 | 5/1962 | Anderson | 251/327 |
| 2,204,452 | 6/1940 | Seppelfricke | 251/327 |
| 2,797,062 | 6/1957 | Otter | 251/328 |
| 3,006,597 | 10/1961 | Hookway | 251/327 |
| 3,042,361 | 7/1962 | Garrott | 251/327 |
| 3,160,389 | 12/1964 | Schmitz | 251/327 |
| 3,185,437 | 5/1965 | Rice | 251/327 |
| 3,217,735 | 11/1965 | Statler | 137/315 |
| 3,380,710 | 4/1968 | Pletcher et al. | 251/327 |
| 3,746,304 | 7/1973 | Matthias | 251/327 |
| 3,938,779 | 2/1976 | Benjamin | 251/327 |
| 4,570,665 | 2/1986 | Zimmerly | 137/241 |
| 4,592,534 | 6/1985 | Ueda et al. | 251/327 |
| 5,004,210 | 4/1991 | Sarno | 251/279 |

FOREIGN PATENT DOCUMENTS 956477 4/1964 United Kingdom ............... 251/327

*Primary Examiner*—George L. Walton
*Attorney, Agent, or Firm*—Ryan, Kees & Hohenfeldt

[57] ABSTRACT

A gate valve assembly is provided which includes a valve body having a fluid passage extending laterally therethrough which has an inlet end and an outlet end, with means at the inlet end and at the outlet end to connect the valve body to a fluid conveying conduit. The passage has a bottom surface coplanar with the bottom of the conduit and is free of recesses capable of preventing the drainage of liquids. An axially extending valve chamber intersects the passage and is disposed perpendicularly to the axis of the passage, the chamber having an elliptical cross-section with its widest dimension perpendicular to the passage. An axially and non-rotationally movable valve member is fitted closely within the chamber and has an internal, downwardly tapered hard, core member formed of metal, glass ceramic or hard plastic material. The core is surrounded by an elastomeric elliptically cross-sectioned outer member. The elastomeric member has a generally flattened bottom surface adapted to engage the bottom of the passage and is dimensioned to close the passage when extended into the closed position.

9 Claims, 2 Drawing Sheets

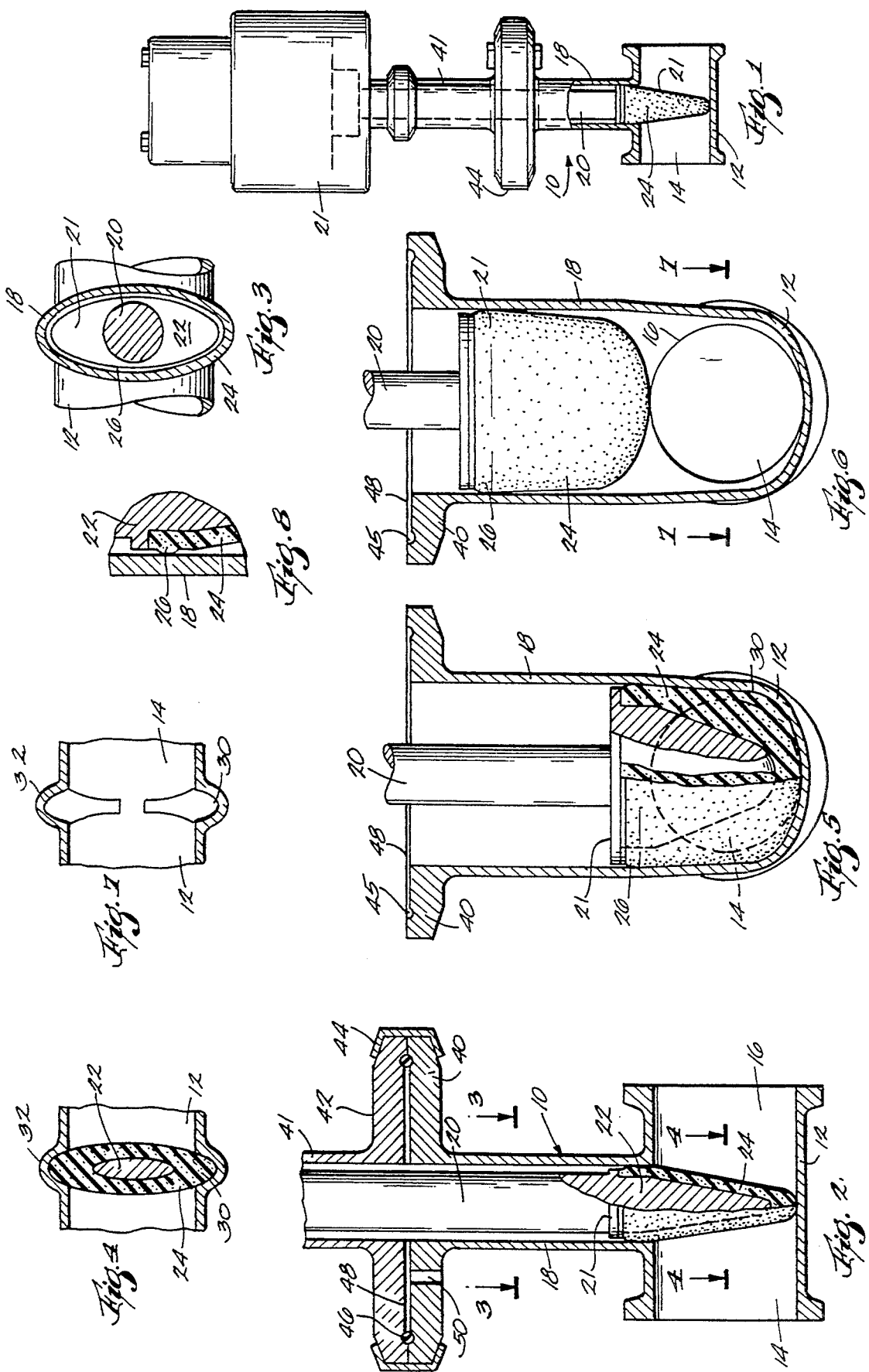

5,439,024

SANITARY GATE VALVE WITH TAPERED VALVE PLUG

FIELD OF THE INVENTION

This invention relates to a flow control valve for fluids and more particularly to a valve suitable for lines conveying liquid food products.

BACKGROUND OF THE INVENTION

Various valve configurations of the type commonly referred to as gate valves have been devised. A common configuration is of the general type disclosed in U.S. Pat. No. 3,420,499 issued Jan. 7, 1969 to Plepcher et al. In that design a hand operated handle is rotated to raise and lower a valve member contained in a valve housing. As shown, a round plug is commonly employed as the gate valve member. The round plug, which may be formed of rubber of another elastomer, is expanded by action of shoulders engaging the top of the plug. A common shortcoming of such configurations is caused by the fact that the rubber plug on expanding due to pressure from a washer or shoulder does not consistently expand in the areas where sealing is needed when pressure is applied.

A further problem is that the bottom of the valve contains a depression in which liquids can accumulate. While minor amounts of such accumulation is no problem in many applications, it is not acceptable in piping used to convey foodstuffs. Such standing accumulations would be highly undesirable because it would represent an area where foodstuffs could accumulate and decay and in which bacteria could multiply. Thus, such depressions in foodstuff conveying lines are prohibited both by government and industry standards.

Another valve configuration which has been proposed involves the fitting of a barrel-shaped plug or valve member into a conically shaped recess. See, for example, U.S. Pat. No. 4,592,534 issued Jun. 3, 1985 to Ueda et al. The barrel shaped plug in such configurations, however, is free to expand on compression into the passageway through the valve and is thus subject to excessive wear upon repeated opening and closing of the valve.

It is an important object of the present invention to provide an improved valve assembly of the gate valve type in which the valve element is raised and lowered in a valve chamber. Both the valve chamber and the plunger are preferably of an elliptical or oblong shape with the wide dimension extending perpendicularly to the passageway through the valve. The valve member is formed of a soft rubber element generally shaped to engage the bottom of the valve chamber and is caused to expand when the member engages the bottom of the chamber by means of an internal tapered member within the outer rubber member. The interior element which is preferably formed of metal is of a shape which causes the rubber element to expand so that the valve chamber is tightly sealed.

It is a further object to provide such a valve which can be tightly sealed even in the absence of any recess or depression in the bottom of the valve chamber. A related further object relates to the fact that the absence of such recess makes the present valve configuration ideal for use in fluid food conveying systems. The fluid foods may be liquids, viscous materials, semi-solids or liquids containing suspended solids.

An important attribute of the valves of the present invention is that materials are prevented, by the design, from entering the valve stem region behind the valve plug. A further aspect of the invention relates to the provision of wash ports above the valve body, thereby providing aseptic valves when needed. A further advantage of the invention is that the valve plug cannot rotate within the valve cylinder because of its non-circular cross-section.

Briefly summarized, the objects and advantages of this invention are achieved by providing a gate valve assembly which includes a valve body having a fluid passage extending laterally therethrough. The passage has an inlet end and an outlet end, with means at the inlet end and at the outlet end to connect the valve body to a fluid conveying conduit. The passage has a bottom surface coplanar with the bottom of the conduit and is free of recesses capable of preventing the drainage of liquids. An axially extending valve chamber intersects the passage and is disposed perpendicularly to the axis of the passage, the chamber having an elliptical cross-section with its widest dimension perpendicular to the passage. An axially and non-rotationally movable valve member is fitted closely within the chamber and has an internal, downwardly tapered hard, core member formed of metal, glass, ceramic or hard plastic material. The core is surrounded by an elastomeric elliptically cross-sectioned outer member. The elastomeric member has a generally flattened bottom surface adapted to engage the bottom of the passage and is dimensioned to close the passage when extended into the closed position. Means, which may be motor driven or hand operated, are provided to extend and retract the valve member within the valve chamber.

DESCRIPTION OF THE DRAWINGS

The invention will be further set forth in the following detailed description and with reference to the accompanying drawings wherein: 10 FIG. 1 is a side view of a valve of the present invention with portions of the valve broken away and indicated in cross-section to show the interior of the valve;

FIG. 2 is a cross-sectional side view of a valve of the present invention with the valve member partly broken away and in cross-section to show the interior thereof;

FIG. 3 is a cross-sectional view taken along line 3—3 of FIG. 2;

FIG. 4 is a cross-sectional view taken along line 4—4 of FIG. 2;

FIG. 5 is a cross-sectional view of a valve of this invention viewed along the axis of the valve passageway with the valve member partly broken away and in cross-section to show the interior structure therein with the vale in the closed position;

FIG. 6 is a cross-sectional valve viewed along the axis of the passageway with the valve in the open position;

FIG. 7 is a cross-sectional view taken along line 7—7 of FIG. 6;

FIG. 8 is a broken away cross-sectional view showing the interface between the valve chamber and the valve member;

DETAILED DESCRIPTION

Figure 9:
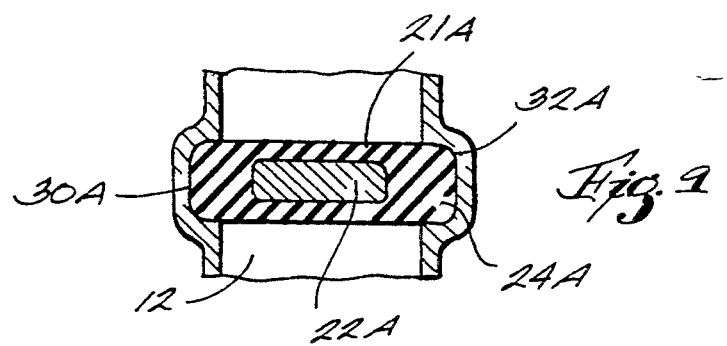
FIG. 9 is a cross-sectional view taken along Line 4—4 showing a modified embodiment of the invention; and, FIG. 10 is a cross-sectional view taken along Line 4—4 showing yet another modified embodiment of the invention.

Referring more specifically to the drawings there is seen a valve assembly generally indicated by numeral 10. Valve assembly 10 includes a valve body 12 having a lower portion 14 which contains a passageway 16 for flow of fluids through the valve. The valve body also contains a valve chamber 18 which extends radially away from its intersection with the passageway 16. Closely fitted in the valve chamber 18, which, as best seen in FIG. 3, is preferably of an elliptical shape, is a valve member 21 which includes a stem 20 to which is attached a metal or other hard interior valve member 22. Member 22 is of a tapered configuration as best seen in FIGS. 2 and 5. The valve sealing element 24 is formed of rubber or other elastomeric material and is of a non-circular, for example elliptical, cross-section that fits closely within the interior of valve chamber 18. Elastomeric valve member 24 is also generally tapered but provided with a flattened bottom and considerably less tapered sides than interior element 22. Integral with the upper shoulder of elastomeric member 24 is a rounded protruding integral lip 26 which has an outer surface resembling that of an O-ring.

An actuator 21, which may be an air cylinder or similar conventional device, is provided to raise and lower the valve stem 20 and the parts carried by it within the valve chamber 18. It will be apparent to those skilled in the art that a hand operated valve (not shown) for example of the type illustrated in the above-noted Plepcher et al. Patent, can be used in cases where it is desired to control the valve manually.

As seen in FIGS. 3, 4 and 7 the sides of chamber 18 extend downwardly into recesses 30 and 32 formed in the sides of the bottom 14 of the valve body. These recesses form a track within which the valve member 24 can travel up and down as the valve is opened and closed. It will be apparent, see for example FIGS. 2 and 5, that when downward pressure is applied to the stem 20 that the wedge shape of the interior of valve member element 22 will cause outward and downward force to be applied to the elastomeric outer valve member 24 to cause it to expand closely against the bottom of the passageway 16 and the sides of recesses 30 and 32 to effect a tight sealing of the valve to securely cut off flow of liquids or other fluids through valve 10.

As seen in FIG. 2 the upper end of valve cylinder 18 can be provided with an outwardly projecting circular flange. Flange 40 is connected to an upper stem housing 41 by means of a mating circular flange 42. The flanges can be secured together as shown by an encircling clamp 44. An O-ring 46 fitted in a groove 45 in each flange is provided in order to make a fluid tight seal. As also seen in FIG. 2 each of the flanges 40 and 42 can be provided with a central portion that is cut back to form a space 48. Space 48 is in communication with the upper end of cylinder 18 above (or behind) valve member 21. A port 50 which can be fitted with stopping or closing means (not shown) is provided so that the upper portion of valve chamber 18 behind valve number 21 can be cleaned by steam.

Figure 10:
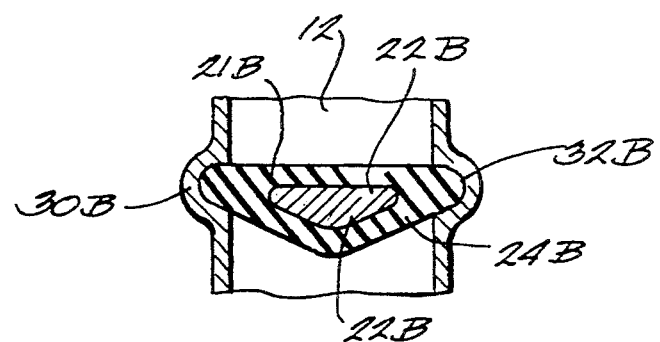

As seen in FIGS. 9 and 10 the valve number 21 can be provided different shapes other than elliptical. In the embodiment of FIG. 9 an oblong generally rectangular shaped valve member 21A is shown. Interior valve core 22A is similarly rectangular with rounded corners as is the elastomeric outer valve member component 24A. Grooves 30A and 32A on opposite sides of conduit 12 are similarly shaped in order to accommodate the outer edges of elastomeric member component 24A. In the embodiment of FIG. 10, the valve member 21B is shown of a generally flattened triangular configuration. Interior valve core 22B and outer elastomeric component 24B are each provided of such configuration. Side channels 30B and 32B are shaped accordingly, to receive and form a track for the edges of the component 24B.

In the preferred embodiment a relatively soft rubber having a Shore A durometer of approximately 50 to 90 and preferably 80 to 90 is employed. Interior valve member 22 is preferably formed of metal but other materials such as ceramic glass or hard plastic can be substituted as well. In the case of valves designed for food conveying conduits it is desirable that easily sanitized materials such as stainless steel be employed.

The inlet and outlet end of valve body 12 are provided with suitable conventional means to attach the same to a conduit, for example, threads, welds, clamps or the like. In the case of food conveying conduits it is necessary that the conduit including the valve be free of depressions or recesses that would allow the accumulation of liquids or prevent the natural drainage thereof through the conduit.

It is apparent from the foregoing that there has been provided in accordance with the invention, a sanitary gate valve suitable for use in the food processing industry, which can be used in other applications as well, that fully satisfies the objects, aims and advantages set forth above. While the invention has been described in conjunction with specific embodiments thereof, it is evident that many alternative embodiments or modifications can be used as will be apparent to those skilled in the art. Accordingly, it is intended that the invention be limited only by the scope and spirit of the appended claims.

What is claimed

1. A valve assembly comprising a valve body having a fluid passage extending laterally therethrough having an inlet end and an outlet end, means at the inlet end and at the outlet end to connect the valve body to a fluid conveying conduit said passage having a bottom surface coplanar with the bottom of said conduit and being free of recesses capable of preventing the drainage of liquids therefrom, the bottom of said conduit and said fluid passage being flat so that materials conveyed through said conduit cannot collect in the bottom thereof, an axially extending valve chamber intersecting said passage and disposed perpendicularly to the axis of said passage, said chamber having an flattened elliptical cross-section extending substantially along the entire length of said valve chamber with its widest dimension being perpendicular to said passage, said elliptical cross section progressively decreasing in dimension toward the bottom of said conduit, the lateral periphery of said cross-section defining a pair of recesses for receiving a valve member slidably fitted in said chamber an axially and non-rotationally movable valve member fitting closely within said valve chamber, said member having an internal, downwardly tapered hard, core member and an elastomeric elliptically cross-sectioned outer member enclosing the forward, rearward, lateral and bottom surfaces of the internal member, said elastomeric member having a generally flattened bottom surface complementary with and adapted to engage the bottom of said passage and being dimensioned to close said passage when extended into the closed position, wherein it engages the decreasing dimension of said elliptical cross section thereby providing a wedge type sealing action therebetween, said valve member having an upper shoulder that engages and seals said chamber during the length of its travel in both the opened and closed directions, the lateral edges of said elastomeric member being dimensioned to be slidably and sealingly received in said recesses and, means to extend and retract said valve member within said valve chamber.

2. A valve assembly according to claim 1 wherein the valve cavity extends downward into a recess formed on each side of the passageway, said recesses forming a track within which said elastomeric member can travel upwardly and downwardly.

3. A valve assembly according to claim 1 wherein an air driven motor is used to extend and retract the valve member.

4. A valve assembly according to claim 1 wherein said elastomeric member has a durometer of approximately 50 to 90.

5. A valve assembly according to claim 1 wherein said interior member has tapered sides and said elastomeric member is provided with straight sides adapted to slide upwardly and downwardly in contact with the walls of said valve chamber.

6. A valve assembly according to claim 1 wherein the upper shoulders of said elastomeric member are provided with protruding rounded edges adapted to closely engage and seal said valve chamber as said valve member is extended and retracted therein.

7. A valve assembly according to claim 1 wherein an opening is provided in the valve body, located proximally to the maximum retracted position of the valve member.

8. A valve assembly comprising
a valve body having a fluid passage extending laterally therethrough having an inlet end and an outlet end,
means at the inlet end and at the outlet end to connect the valve body to a fluid conveying conduit,
said passage having a bottom surface coplanar with the bottom of said conduit and being free of recesses capable of preventing the drainage of liquids therefrom, the bottom of said conduit and said fluid passage being flat so that materials conveyed through said conduit cannot collect in the bottom thereof,
an axially extending valve chamber intersecting said passage and disposed perpendicularly to the axis of said passage, said chamber having an flattened oblong cross-section extending substantially along the entire length of said valve chamber with its widest dimension being perpendicular to said passage, said flattened oblong cross section progressively decreasing in dimension toward the bottom of said conduit, the lateral periphery of said cross-section defining a pair of recesses for receiving a valve member slidably fitted in said recesses, an opening being provided into the upper end of the valve body to allow cleaning and sterilization of the upper end of said chamber,
an axially, non-rotationally movable valve member fitting closely within said valve chamber, with its lateral edges slidably and sealingly fitted in said channels, said member having an internal, downwardly tapered, hard core member and an elastomeric oblong cross-sectioned outer member enclosing the forward, rearward, lateral and bottom surfaces of the internal member, said interior member having tapered sides and said elastomeric member being provided with sides adapted to slide upwardly and downwardly into contact with the walls of said valve chamber, said elastomeric member having an upper shoulder that engages and seals said chamber during the length of its travel in both the opened and closed directions and a generally flattened bottom surface adapted to engage the bottom of said passage and being complementary to the shape of and dimensioned to close said passage when extended into the closed position wherein it engages the decreasing dimension of said flattened oblong cross section thereby providing a wedge type sealing action therebetween, and,
means to extend and retract said valve member within said valve chamber.

9. A valve assembly according to claim 8 wherein said valve member has a cross section that is at least one of elliptical, oblong and triangular.

* * * * *